United States Patent Office 2,743,635
Patented May 1, 1956

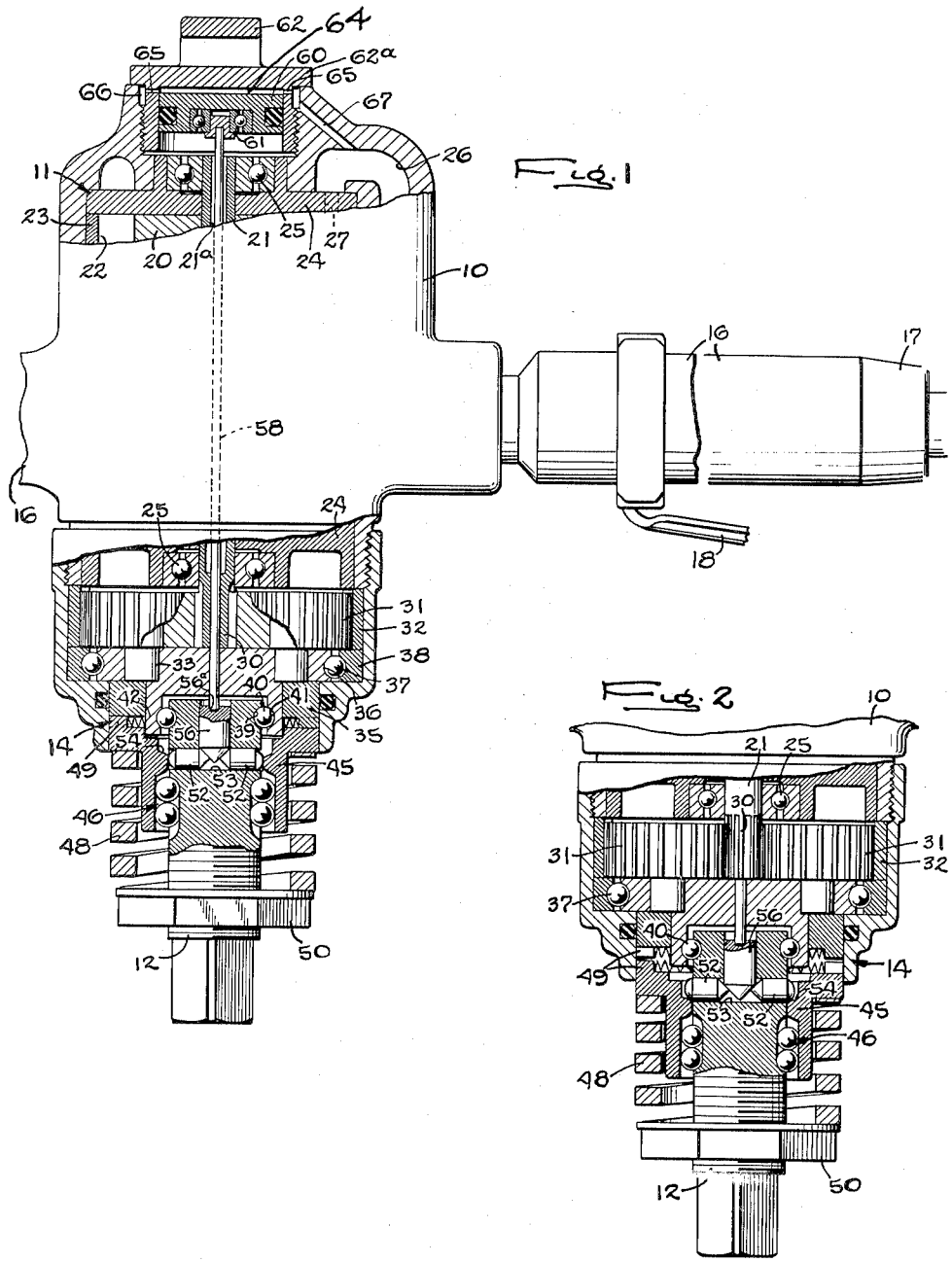

2,743,635

CLUTCH DRIVE MECHANISM FOR PORTABLE POWER OPERATED NUT SETTERS AND THE LIKE

Ernest H. Shaff, Hamilton, Ind., assignor, by mesne assignments, to Gardner-Denver Company, a corporation of Delaware Application June 5, 1952, Serial No. 291,917

6 Claims. (Cl. 81—52.4)

The present invention relates generally to portable power driven tools such as nut setters and the like and more particularly to an improved drive mechanism for such tools.

It is the primary object of the invention to provide an improved clutch drive mechanism for tools of the foregoing general character, including an overload release type clutch which is effective to disengage when a nut or similar threaded fastening element has been driven to a predetermined degree of tightness, together with means for preventing re-engagement of the clutch so long as power is applied to the tool, but which is automatically reset for subsequent operation upon interruption of power supply to the tool.

The object of the invention thus generally set forth, together with other objects and ancillary advantages, is attained by the construction and arrangement shown by way of illustration in the accompanying drawings, in which:

Figure 1 is a fragmentary elevational view, partly in section of a tool embodying the features of the present invention and showing the relationship of the components thereof when the tool is in condition for running or driving a threaded fastening element.

Fig. 2 is a fragmentary sectional view of the forward end portion of the tool illustrated in Fig. 1 and showing component relationship when a fastening element has been set to a predetermined tightness.

While the invention is susceptible of various modifications and alternative constructions, there is shown in the drawings and will herein be described in detail the preferred embodiment, but it is to be understood that it is not thereby intended to limit the invention to the specific form disclosed, but it is intended to cover all modifications and alternative constructions falling within the spirit and scope of the invention as expressed in the appended claims.

As illustrated in the drawings, the exemplary form of the invention is shown embodied in a portable pneumatic nut setter which includes a generally cylindrical casing 10 having a rotary pneumatic motor 11 therein for driving a spindle 12 through the medium of a drive mechanism including a clutch indicated generally at 14. As shown, the casing 10 is equipped with oppositely projecting handles 16. One of the handles has conveniently incorporated therein a throttle valve (not shown) for controlling the supply of pressure fluid, in this instance compressed air, to the tool. The handle is equipped at its outer end with a suitable fitting 17 for the reception of an air hose and has mounted thereon a throttle valve operating lever 18.

The motor 11 is of conventional form and includes a vaned rotor 20 supported upon a shaft 21 and rotatable in an eccentrically disposed motor chamber 22 defined by a cylinder 23 and end plates 24 disposed at opposite ends of the cylinder. The latter are conveniently recessed for the reception of bearings 25 for journaling the motor shaft 21. From the valved handle 16, air is supplied to the motor chamber 22 by way of a tortuous passage 26 formed in the casing 10 and an inlet port 27 in the rear end plate.

The driving connection between the motor 11 and the spindle 12 includes not only the clutch 14 but also speed reduction gearing. This speed reduction gearing is of the planetary type and includes a driving gear 30 rigid with the forward end of the motor shaft 21. The driving gear meshes with idler gears 31 which are rotatable within a fixed ring gear 32. The idler or planetary gears 31 are rotatable on stub shafts 33 carried by a spider 34 which, in the present instance, serves additionally to support the upper or driving element 35 of the clutch 14. The spider is formed with a peripheral groove 36 which serves as the inner race for antifriction bearing elements 37, the outer race for such bearing elements being formed by an internally grooved ring 38 fixed within the casing 10.

To journal the inner end of the spindle 12, the same is provided with a peripheral groove 39 for reception of antifriction bearing elements 40. The outer race for the bearing elements 40 is provided by an appropriate internal groove 41 formed within and adjacent the forward end of a coaxially disposed, forwardly projecting boss 42 on the idler gear spider 34.

The driving element 35 of the clutch 14 comprises a centrally apertured disk mounted on the boss 42 of the spider 34 in fixed relation thereto. In addition to the upper or driving clutch element 35, the clutch 14 includes a lower or driven clutch element 45. The latter is axially shiftable on the spindle 12 but is maintained in non-rotative relation with respect thereto through the medium ball splines 46. The driven clutch element is normally urged into engagement with the driving clutch element 35 by means of an expansion type spring 48. The opposed faces of the driving and driven clutch elements are formed with generally radially disposed tapered teeth 49, those on the driving clutch element 35 being adapted to override those on the driven clutch element 45 when a fastening element being driven by the tool attains a desired degree of tightness.

In order to permit adjustment of the point of release or disengagement of the clutch 14, means is provided to adjust the tension of the clutch spring 48. In the present instance, this means includes a tension adjusting nut 50 which is screw threaded onto the spindle 12 for axial adjustment therealong. The clutch spring 48 is interposed between it and the lower or driven clutch element 45 about the forward end portion of the latter and about the spindle 12.

In accordance with the present invention, means responsive to the application of power to operate the tool is provided for maintaining the clutch 14 in disengaged condition after initial release thereof when a fastening element being run by the tool has attained the degree of tightness as predetermined by the tensioning of the clutch spring 48, which means is operative to permit re-engagement of the clutch 14 automatically upon interruption of the power supply to the tool.

The aforesaid means includes lockout elements and actuator means for moving the lockout elements into engagement with the disengaged clutch member to prevent resetting of the clutch 14 after initial release thereof so long as power is supplied to the tool. The actuator means is normally biased into non-holding relation so that upon interruption of the supply of power to the tool automatic resetting of the clutch 14 obtains whereby the tool is conditioned for subsequent operation.

In the illustrative embodiment, the lockout elements comprise a pair of plungers 52 which are received in the opposite ends of a transverse passage 53 disposed intermediate the ends of the spindle 12, which are adapted to be projected into the return path of the driven clutch element 45 after release of the clutch 14 so as to prevent its re-engagement with the driving clutch element 35. As shown, for engagement by the plungers 52, the driven clutch element 45 has an internal flange 54 therein which is normally disposed in substantially registering relation with the transverse spindle passage 53 when the clutch is engaged. Thus the flange serves normally to prevent movement of the lockout plungers 52.

The actuator means for the lockout elements includes a member engageable with the plungers 52 and shiftable axially of the tool between locking and unlocking positions with respect to the blocks together with power operated means for shifting and holding it in its locking position. As herein shown, this member comprises a cam block 56 having a generally conical forward end portion interposed between the inner ends of the lockout plungers 52. The latter have end portions of generally conical form for cooperation with the cam block 56. To move the cam block 56 forwardly so as to urge the lockout plungers 52 outwardly in the transverse spindle passage 53, the cam block is equipped with a push rod 58. The push rod 58 extends coaxially through the motor shaft 21, the latter being provided with a suitable coaxial bore 21a to accommodate the push rod and within which it is axially shiftable. To receive the forward end of the push rod, the cam block 56 is provided with a coaxial recess 56a in the rear face thereof.

In the illustrative embodiment of the present invention, the push rod 58 and the cam block 56 are adapted to be urged forwardly by means of an air piston 60 disposed at the rear end of the push rod. In order to accommodate any rotation of the push rod that might be occasioned by frictional drag between it and the motor shaft 21, the rear end thereof is journaled in an antifriction bearing 61 mounted in the forward face of the air piston.

The air piston 60 is received within a cylinder defined by an end plug 62 which is screw threaded into the rear end of the casing 10. Thus the end plug 62 and the piston 60 define a pressure chamber 64 to which air is admitted to urge the piston forwardly by way of peripherally disposed ports 65 in the end plug 62 adjacent the rear of the chamber 64. These passages communicate with an annular chamber 66 formed by suitably counterboring the main casing 10 at its rear end and by a peripheral flange 62a formed integral with the end plug 62. The chamber 66 and thus the chamber 64 are in continuous communication with the air supply passage 26 to the tool by way of a passage 67 in the main casing 10.

It will be apparent that so long as the lever 18 on the handle 16 is depressed to open the throttle valve therein whereby to admit pressure fluid to operate the tool, pressure fluid is also supplied to the chamber 64 behind the piston 60 to urge the same, the push rod 58 and the cam block 56 forwardly. Thus the lockout plungers 52 are urged outwardly in the transverse passage 53 in the spindle 12. With the clutch 14 engaged, however, outward movement of the lockout plungers 52 and forward movement of the cam block 56, the push rod 58 and the piston 60 are prevented, because of the normal disposition of the flange 54 of the driven clutch element 45 in registry with the transverse spindle passage 53.

Upon attainment by a nut or similar threaded fastening element of a desired degree of tightness as determined by the tensioning of the clutch spring 48, disengagement of the clutch 14 is effected. Thus the driven clutch element is moved forwardly with respect to the spindle 12. Upon such movement thereof, the flange 54 is moved out of registry with the transverse spindle passage 53 and the lockout plungers 52 are projected outwardly behind the flange 54 through the action of pressure fluid in the chamber 64 on the piston 60 and acting through the push rod 58 and the cam block 56. It will be apparent that the lockout plungers 52 will be maintained in their projected positions, preventing re-engagement of the driven clutch element 45 with the driving clutch element 35, so long as pressure fluid supplied to the tool is continued, because once they have been projected outwardly the cam block 56 in its forward movement attains its locking position between the inner ends of the lockout plungers 52, the cam block being held in such position by the action of pressure fluid on the piston 60.

Upon interruption of the supply of pressure fluid to the tool, the force exerted thereby on the piston 60 is relieved and the push rod 58 and cam block 56 are no longer effective to maintain the lockout plungers 52 in their projected positions. Thus, under the action of the clutch spring 48, the driven clutch element 45 is moved rearwardly toward engagement with the driving clutch element 35. Upon such movement, the flange 54 serves to cam the lockout plungers 52 inwardly in the spindle passage 53. Inward movement of the lockout plungers 52, which are in engagement with the cam block 56, forces the cam block, the push rod, and the air piston rearwardly toward their initial positions, as shown in Fig. 1. Upon interruption of the supply of pressure fluid to the tool following disengagement of the clutch, fluid pressure in the chamber 64 is relieved by way of the ports 65, the chamber 66, the passages 67 and 26, and the motor inlet port 27 through the motor 11 to the atmosphere, thus permitting the rearward movement of the air piston in the chamber 64.

It will be apparent, therefore, that a tool constructed in accordance with the present invention effectively releases upon attainment by a fastening element driven thereby of a predetermined degree of tightness and resetting is prevented so long as power is supplied to the tool. However, resetting obtains for subsequent operation automatically upon interruption of power supplied to the tool.

I claim as my invention:

1. In a power operated tool for driving a screw-threaded fastening element, a drive mechanism comprising, in combination, a spindle, an overload-release type clutch having normally engaged driving and driven elements, one of said clutch elements being axially movable with respect to said spindle and having an internal shoulder therein adjacent to said spindle, lockout means including a lockout plunger carried by said spindle and movable in a generally radial direction with respect thereto for engagement with said one clutch element, said shoulder being normally disposed opposite said lockout plunger and said plunger being engageable behind said shoulder upon initial disengagement of said clutch, and actuator means for said lockout means responsive to the supply of power to the tool to urge said plunger toward its lockout position, said actuator means being movable into holding relation to said plunger as an incident to disengagement of said clutch to move said lockout plunger into locking engagement with said one clutch element and to maintain the same in such position to prevent re-engagement of said clutch so long as power is supplied to the tool.

2. In a power operated tool for driving a screw-threaded fastening element, a drive mechanism comprising, in combination, a spindle, an overload-release type clutch having driving and driven elements and a spring normally urging the same into engagement, one of said clutch elements being axially movable with respect to said spindle, lockout means including a member carried by said spindle and movable with respect thereto for engagement with said one clutch element upon initial disengagement of said clutch, and actuator means for said lockout means responsive to the supply of power to the tool and supported for movement into and out of holding relation to said member, said actuator means being operative as an incident to disengagement of said clutch to move said member into locking engagement with said one clutch element and to maintain the same in such position to prevent re-engagement of said clutch so long as power is supplied to the tool, said clutch spring acting through said one clutch element and said member to bias said actuator means toward non-holding relation to said member so that said one clutch element is released for re-engagement with the other clutch element and said member and actuator means are automatically reset upon interruption of power supply to the tool.

3. In a pneumatic tool for driving a screw-threaded fastening element, the combination of a spindle having a transverse passage intermediate its ends and having an axial bore therein intersecting said passage, an overload-release type clutch having normally engaged driving and driven elements, one of said clutch elements being axially movable with respect to said spindle, a lockout plunger received in said spindle passage and movable therein into and out of engagement with said one clutch element, and actuator means including a cam member received in said spindle bore and engageable with said lockout plunger and including a piston responsive to the supply of compressed air to the tool and operatively connected to said cam member for moving said cam member so as to urge said lockout plunger toward its locking position so long as power is supplied to the tool, said lockout plunger being engageable with said one clutch element upon initial disengagement of said clutch.

4. In a pneumatic tool for driving a screw-threaded fastening element, a drive mechanism comprising, in combination, a spindle, an overload-release type clutch having normally engaged driving and driven elements, one of said clutch elements being axially movable with respect to said spindle, lockout means including a member carried by said spindle and movable with respect thereto for engagement with said one clutch element upon initial disengagement of said clutch, and actuator means including a cam block engageable with said member and including a piston for said lockout means responsive to the supply of compressed air to the tool for moving said cam block into and out of holding relation to said member, said actuator means being normally biased into non-holding relation to said member and said piston being operative as an incident to disengagement of said clutch to move said cam block into holding relation to said member to move and maintain the same in locking engagement with said one clutch element to prevent re-engagement of said clutch so long as power is supplied to the tool.

5. In a power driven tool, a tool spindle, drive means for the spindle including a clutch automatically disengageable under overload comprising a driving clutch element, a driven clutch element slidably but non-rotatably connected with the spindle, and spring means normally restraining disengagement of the clutch elements, lockout means including a transversely shiftable member on the spindle and a shoulder on the driven clutch element respectively interengageable to hold the clutch element disengaged, and means effective upon disengagement of the clutch to move said member into holding relation to said shoulder.

6. In a pressure fluid operated tool having a supply passage, a tool spindle, drive means for the spindle including a clutch automatically disengageable under overload comprising a driving clutch element, a driven clutch element slidably but non-rotatably connected with the spindle and spring means normally restraining disengagement of the clutch elements, lockout means including a transversely shiftable member on the spindle and a shoulder on the driven clutch element respectively interengageable to hold the clutch disengaged, pressure fluid operated means responsive to the delivery of fluid pressure to said passage and effective upon disengagement of the clutch to move said member into holding relation to said shoulder.

References Cited in the file of this patent

UNITED STATES PATENTS

| 1,725,562 | Borchert | Aug. 20, 1929 |
| 2,263,709 | Van Sittert | Nov. 25, 1941 |
| 2,475,518 | Ristow | July 5, 1949 |
| 2,600,327 | Ridge | June 10, 1952 |
| 2,634,640 | Pedersen | Apr. 14, 1953 |